US012661284B2

(12) United States Patent
Patterson et al.

(10) Patent No.: US 12,661,284 B2

(45) Date of Patent: Jun. 23, 2026

(54) AUTOMATED HOME HEALTH PATIENT CARE SYSTEM

(71) Applicant: Richard A Patterson, Hutto, TX (US)

(72) Inventors: Richard A. Patterson, Hutto, TX (US); Roy M. Patterson, Hutto, TX (US)

(73) Assignee: Richard Patterson, Hutto, TX (US)

( * ) Notice: Subject to any disclaimer, the term of this patent is extended or adjusted under 35 U.S.C. 154(b) by 50 days.

(21) Appl. No.: 18/882,140

(22) Filed: Sep. 11, 2024

(65) Prior Publication Data

US 2026/0069475 A1 Mar. 12, 2026

(51) Int. Cl.

*A61G 5/00* (2006.01)
*A61G 7/018* (2006.01)
*A61G 7/10* (2006.01)

(52) U.S. Cl.

CPC ............. *A61G 5/006* (2013.01); *A61G 7/018* (2013.01); *A61G 7/1019* (2013.01); *A61G 7/1049* (2013.01); *A61G 2200/32* (2013.01)

(58) Field of Classification Search

CPC .......... A61G 5/00; A61G 5/006; A61G 7/015; A61G 7/0513; A61G 2203/723; A61G 7/005; A61G 7/012; A61G 7/018; A61G 7/053; A61G 7/1046; A61G 2200/32

USPC ....................................... 5/81.1 R, 83.1–89.1

See application file for complete search history.

(56) References Cited

U.S. PATENT DOCUMENTS

| | | | | | |
|---|---|---|---|---|---|
| 2,536,707 | A * | 1/1951 | Allyn | A61G 7/1015 | 5/85.1 |
| 3,947,902 | A | 4/1976 | Conde et al. | | |
| 4,776,047 | A * | 10/1988 | DiMatteo | A61G 7/1032 | D12/132 |
| 4,794,655 | A | 1/1989 | Ooka et al. | | |
| 5,544,371 | A * | 8/1996 | Fuller | A61G 7/1015 | 5/85.1 |
| 6,289,533 | B1 * | 9/2001 | Hodgetts | A61G 7/1032 | 5/81.1 R |
| 8,789,219 | B2 | 7/2014 | Patterson et al. | | |
| 9,655,800 | B1 | 5/2017 | Ferderber | | |
| 2007/0000049 | A1 * | 1/2007 | White | A61G 7/001 | 5/84.1 |
| 2007/0226901 | A1 * | 10/2007 | Pervorse | B60P 1/02 | 5/118 |
| 2011/0209286 | A1 * | 9/2011 | Dane | A61G 7/1032 | 5/619 |
| 2016/0310337 | A1 * | 10/2016 | Capilla | A61G 7/1046 | |
| 2020/0206052 | A1 | 7/2020 | Yokota | | |

(Continued)

*Primary Examiner* — J. T. Newton

(74) *Attorney, Agent, or Firm* — Jack V. Musgrove

(57) ABSTRACT

A transfer device comfortably picks up a patient from a bed, then moves to the side of the bed for offloading the patient onto an accessory such as a chair. The bed has rails which act as tracks to engage a roller base of the transfer device, and lead screws for automating sideways movement of the device. The device uses a lifting system having strap storage at the head of the frame and web storage at the foot, the storage units vertically movable along support posts to multiple levels including a stowed level near the bottom and a clearance level near the top. The web storage contains an extendable dual web with a roller nose assembly, and the strap storage contains retractable pull straps having ends secured to the roller nose assembly. The transfer device has a compact design allowing the lifting system to be hidden underneath the bed.

3 Claims, 10 Drawing Sheets

(56) References Cited

U.S. PATENT DOCUMENTS

| | | | |
|---|---|---|---|
| 2023/0225921 | A1 | 7/2023 | In et al. |
| 2024/0016683 | A1 | 1/2024 | Ansari et al. |

* cited by examiner

FIG. 4
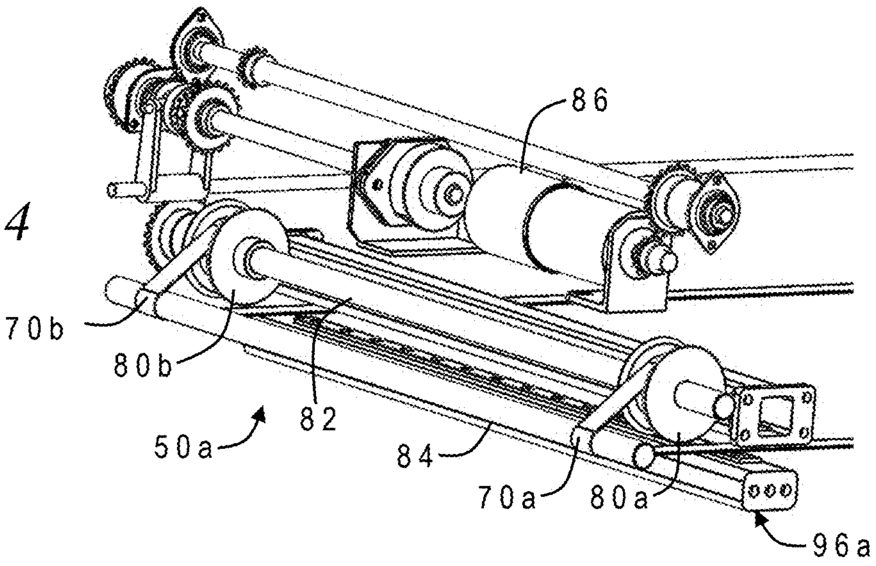
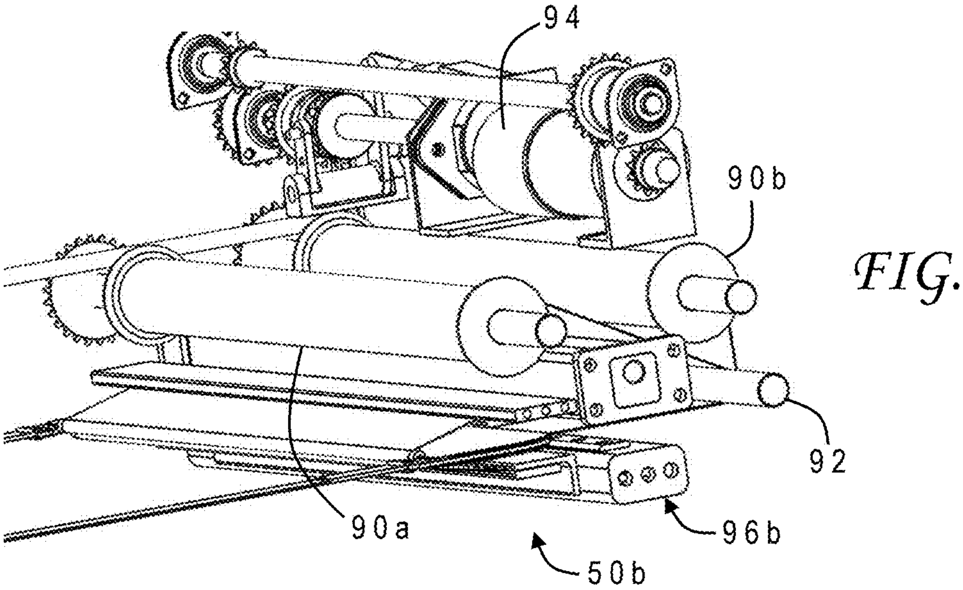
FIG. 5
FIG. 6
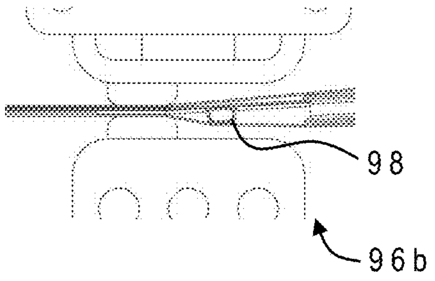

FIG. 7
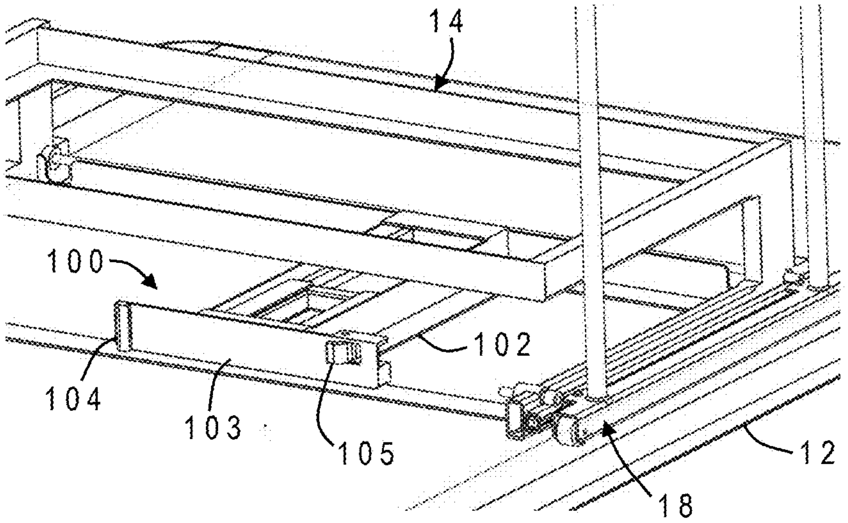
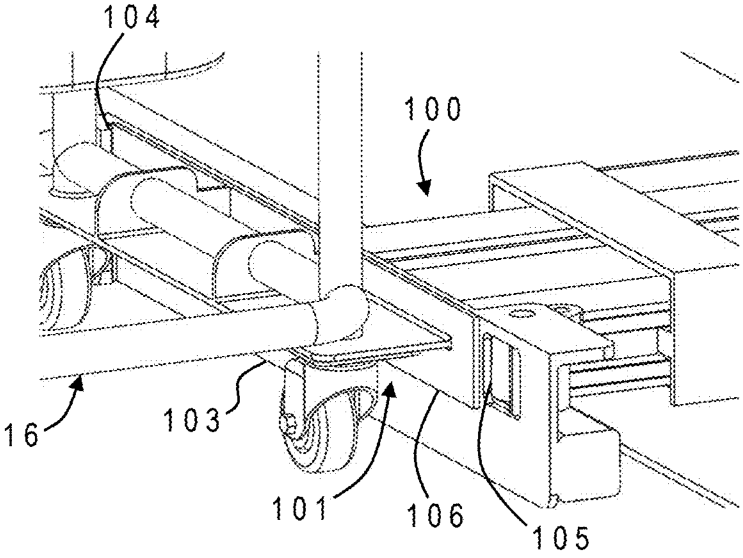
FIG. 8

AUTOMATED HOME HEALTH PATIENT CARE SYSTEM

BACKGROUND OF THE INVENTION

Field of the Invention

The present invention generally relates to moving systems for mobility-impaired individuals, and more particularly to a lifting system which is used to transfer a patient from one horizontal support surface to another, such as from a bed to a chair.

Description of the Related Art

A wide variety of lift and transfer systems have been devised to help mobility-impaired individuals, ranging from simple devices like slings to more complicated mechanical designs. Lifting and moving these individuals is usually done by family members, friends or professional caregivers in home care situations, and by trained nurses or therapists in institutional settings. Whenever disabled individuals are lifted or moved, there is always a possibility for injuring that person, as well as the caregiver who is moving them, so it is preferable to have patient lift and transfer systems that assist in this effort.

Some of these lift and transfer systems utilize one or more belts or webs in various configurations that can reach under the patient and provide a hammock-like support, allowing lifting of the patient, who can then be moved via different types of hoists. One such design is seen in U.S. Pat. No. 8,789,219, in which two webs are wrapped around front rollers in such a manner that the webs can be pulled under the patient with essentially no frictional engagement. The web assembly is held by a lifting frame attached to a bridle which is rotatably connected to an overhead arm such that the entire web assembly can be rotated and moved to the side for patient offloading.

SUMMARY OF THE INVENTION

The present invention in at least one embodiment is generally directed to a patient lift and transfer apparatus having an elongate bed assembly, an elongate transfer frame and a lifting web system. The bed assembly has foot rails at each end, and the transfer frame roller base slides at each end which slidably engage the foot rails so the transfer frame is movable sideways from the bed. The lifting web system has a strap storage unit at a head end of the transfer frame and a web storage unit at a foot end of the transfer frame, the strap and web storage units being mounted on vertical posts of the transfer frame and being movable to different height levels, wherein the web storage unit houses a portion of an extendable web assembly having a forward edge with a roller nose assembly, and the strap storage unit houses retractable pull straps having distal ends secured to the roller nose assembly. In some implementations the bed assembly further has a transfer frame motor, a mattress and a bed frame supporting said mattress, the foot rails being part of the bed frame which further includes horizontal lead screw assemblies in the foot rails which are threaded in respective lead screw nuts of the roller base slides to impel movement of the transfer frame. The bed assembly further can be C-shaped defining channels at the ends, with the two storage units being positioned within respective channels when the transfer frame is in a stowed state in alignment with the bed assembly. The lifting system also employs a web locking mechanism including actuatable clamps located in the web storage and pull strap storage compartments which forcibly pinch across the full width of the forward and trailing ends of the web assembly when the web assembly is in a fully-extended state, and two battens formed across the width of one web and located at its forward and trailing ends which forcibly abuts an inner face of the clamps located in the web storage and pull strap storage units when the web assembly is in the fully-extended state. The patient lift and transfer apparatus can be equipped with one or more automation motors including a lifting system motor which drives vertical movement of the lifting web system, and an electronic control system which selectively activates the lifting system motor. The electronic control system may further have an operator console with an interface which allows an operator to program at least five different height levels including the stowed level, the clearance level, the acquisition level, the transfer level, and the delivery level. The lift and transfer apparatus may be equipped with a docking feature by providing the bed assembly with a docking frame having a retractable docking plate with first and second ends, a latch being formed at the first end and the second end having an actuatable hook. The accessory has a mounting plate located at a height of the docking plate, and sized such that a first end can be placed in engagement with the latch while the hook is unactuated, and then becomes securely attached to the docking plate when the hook is actuated at the second end.

The above as well as additional objectives, features, and advantages in the various embodiments of the present invention will become apparent in the following detailed written description.

BRIEF DESCRIPTION OF THE DRAWINGS

The present invention may be better understood, and its numerous objects, features, and advantages of its various embodiments made apparent to those skilled in the art by referencing the accompanying drawings.

FIG. 4 is a perspective view of the interior of the strap storage unit in accordance with one implementation of the present invention, illustrating the various spools and links for retracting the pull straps, as well as the clamping of the webs;

FIG. 5 is a perspective view of the interior of the web storage unit in accordance with one implementation of the present invention, illustrating the various spools and links for the upper and lower webs, and a clamp used to lock the web assembly in place;

FIG. 6 is a side elevational view illustrating how a batten may be formed on one of the webs which impinges the gap at the exit of the web storage unit to prevent further release of the webs as part of the locking mechanism in accordance with one implementation of the present invention;

FIG. 7 is a perspective view of a docking station feature which may be provided on the bed frame to receive an accessory device in a controlled fashion in accordance with one implementation of the present invention;

FIG. 8 is a perspective view of the lower portion of the accessory device attached to the docking feature of FIG. 7 in accordance with one implementation of the present invention;

The use of the same reference symbols in different drawings indicates similar or identical items.

DESCRIPTION OF THE PREFERRED EMBODIMENT(S)

Figure 1A:
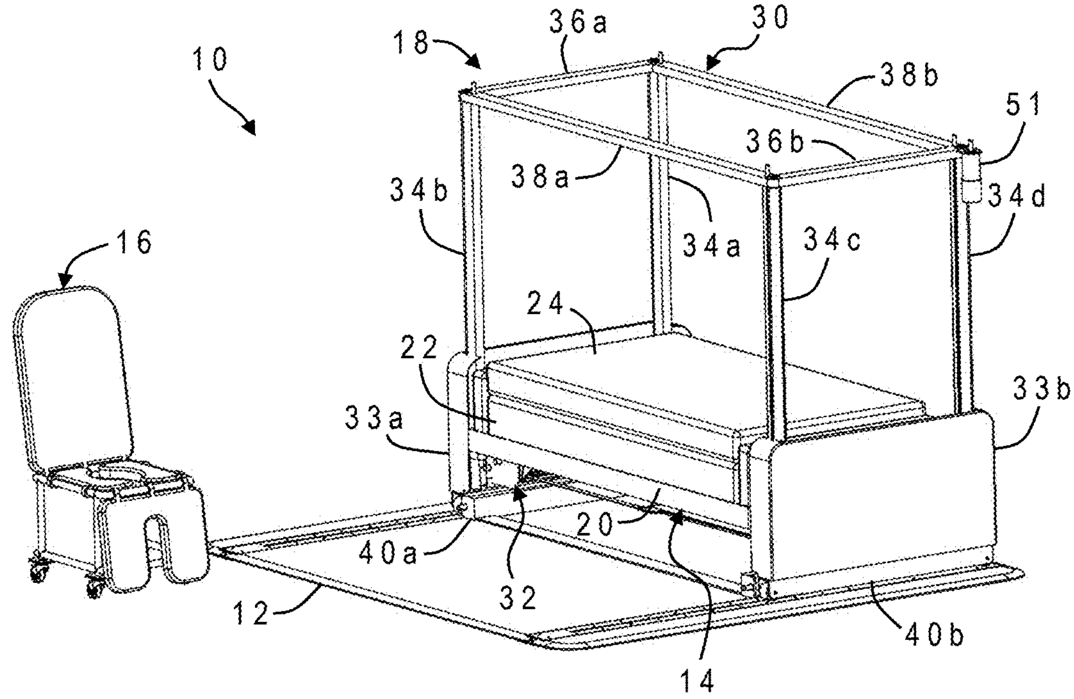
FIG. 1A is a perspective view of an automated home health patient care system in accordance with one implementation of the present invention, showing a transfer device in a stowed position aligned with a bed, and a chair to which a patient on the bed is to be transferred.

It can be a difficult endeavor to move individuals with severe mobility impairments. Simple devices such as slings and harnesses can be very hard and time consuming to install properly in order to setup a patient transfer. Many caregiver injuries arise from sling-type installations due to the awkward lifting required, as well as patient injuries from being dropped or bumping into objects while being lifted or transferred. Slings are also uncomfortable and can cause patient skin pressure ulcers or friction burns, and two (or more) caregivers may still be required for most lifting. Many of these problems persist with mechanical transfer systems that assist in moving a patient. Mechanical transfer systems can be very complicated and quite expensive. Designs with an overhead lift require significant modifications to the patient's living environment, i.e., a home bedroom, and are generally only feasible in more institutional settings. Such physical requirements as well as long-term labor costs can effectively prevent homecare as an option for some patients.

It would, therefore, be desirable to devise an improved method of patient transfer which could enable a single caregiver to effortlessly lift and move mobility-impaired individuals including large or heavy (bariatric) patients. Ideally, all of the patient moving should be done by machine, easily controlled by the caregiver using a simple pushbutton console or pendant. It would be further advantageous if the method could easily accommodate a variety of accessory devices such as wheelchairs or dressing tables, with no requirement to pre-position equipment like a sling under the patient, and no modification required to a patient's home in order to install and deploy the system. These and other advantages are achieved in various implementations of the present invention using a transfer device that neatly fits around a patient bed or other support surface when not in use, but can quickly and smoothly acquire the patient resting on the bed and move to either side of the bed for transfer to another support surface. The transfer device uses a lifting web assembly having dual webs (upper/lower) that emerge from a web storage unit at one end of the device (e.g., the foot end) and comfortably crawl under the patient as pull straps are retracted into a strap storage unit at the other end of the device (e.g., the head end). The web storage unit is mounted on two vertical posts at the foot end, while the strap storage unit is mounted on two vertical posts at the head end, and both storage units can be raised or lowered in a synchronized manner to place the web assembly at any desired number of height levels to adapt to different patient support surface levels. Using the transfer device of the present invention, actual patient move time is reduced by as much as 75% compared to conventional patient transfer devices. The mechanisms used in the transfer device allow for product design and manufacturing techniques similar to exercise equipment, achieving a low production cost, and facilitating an easy setup of the system.

With reference now to the figures, and in particular with reference to FIGS. 1A-1H, there is depicted one embodiment 10 of an automated home health patient care system constructed in accordance with the present invention. Automated home health patient care system 10 is generally comprised of a floor mat 12, a bed assembly 14, an accessory for patient use such as a chair 16, and a transfer device 18 that engages bed assembly 14 and is used to transfer a patient resting on the bed to the chair, or vice-versa. The details of each of these components (floor mat 12, bed assembly 14, accessory 16, and transfer device 18) can vary significantly depending upon the particular implementation and situational specifications. It is also not necessary to have each of these components in every version of system 10 as some, particularly transfer device 18, may be used in other arrangements without the other components. The following details are accordingly for an illustrative implementation only.

Floor mat 12 is provided to cover and protect the carpet or other flooring in the room where the system is to be deployed. Floor mat 12 is preferably beveled along the sides to ease movement of wheeled devices carrying the patient, and may be constructed of any durable material, preferably a hard surface such as a laminate floor product with a protective coating. Floor mat 12 may further contain mounting and tie down features (not shown) to hold the machine frame in permanent alignment with the mat. Bed assembly 14 includes a bed frame 20, a mattress support 22 such as box springs, and a mattress 24 that sits atop mattress support 22. Chair 16 is only one example of many accessory devices that may be used to impart mobility or other functions for the patient. As depicted in the figures, chair 16 has a cutout in the seat portion so it can be used as a portable commode. Other accessory devices may, for example and without limitation, include a powered-assisted wheelchair, a recliner chair (wheeled or not), a dressing station, a shower chair, or a gurney-type apparatus for moving the patient beyond the bounds of his room. Each accessory device is designed to fold flat to accommodate transfers to and from the transfer device in a horizontal orientation. System 10 may include a family of such accessory devices.

Transfer device 18 includes an elongate transfer frame 30, a lifting web system 32 supported by transfer frame 30, and two end panels 33*a*, 33*b* vertically disposed at the head and foot ends of transfer frame 30. Transfer frame 30 is generally rectangular in shape (rectangular prism) with no interior features, and is comprised of four generally parallel vertical posts 34*a*, 34*b*, 34*c*, 34*d* connected at the top by two horizontal transverse crossbars 36*a*, 36*b* and two horizontal longitudinal crossbars 38*a*, 38*b*, and connected at the bottom by two generally parallel horizontal slides 40*a*, 40*b* forming a roller base. As used herein, the terms “vertical” and “horizontal”, as well as other spatial and reference terms (top, bottom, left, right, front, back, etc.), are relative since there may be situations where a particular structural member may not be perfectly vertical or horizontal, or may be adapted for special circumstances, and even the patient may not be horizontal (as discussed further below with the Trendelenburg position). Those skilled in the art will accordingly understand that these terms are not used in an absolute sense and should thus not be considered as limiting the exact geometry of any of the components of system 10. The elements of transfer frame 30 are preferably constructed of a rigid, strong metal such as stainless steel and may be attached by any convenient means, such as welding. Wheels are provided on the bottom of roller base slides 40*a*, 40*b* to allow transfer device 18 to easily roll sideways into its various deployment positions. End panels 33*a*, 33*b* are primarily ornamental in nature to obscure lifting web system 32 although they could be transparent. They also prevent any accidental contact or damage to lifting web system 32 when transfer device 18 is tucked away with bed assembly 14 as seen in FIG. 1A. End panels 33*a*, 33*b* may be constructed of any sturdy material such as various types of wood products or polymers (e.g., high-density polyethylene).

Lifting web system 32 is mostly hidden in FIG. 1A but is visible in different configurations in FIGS. 1B-1H. Construction details of lifting web system 32 are discussed below in conjunction with FIGS. 3-5. Lifting web system 32 uses dual webs (upper and lower) which are pulled under the patient with essentially no frictional engagement, and can be locked in place once fully extended where they completely underlie the patient. Lifting web system 32 includes two boxes or enclosed storage units 50*a*, 50*b* at each end of transfer device to store the pulls straps and webs that are used to extend the webs. The storage units are respectively mounted between pairs of vertical posts of transfer frame 30, i.e., strap storage unit 50*a* is mounted between posts 34*a*, 34*b* and web storage unit 50*b* is mounted between posts 34*c*, 34*d*. Storage units 50*a*, 50*b* are movable vertically along the posts in a controlled fashion, allowing the web assembly to be raised or lowered to any particular level. For those embodiments where storage units 50*a*, 50*b* are moved together up and down (to always maintain both at the same level), lifting web system 32 can provide two longitudinal reinforcement beams 52*a*, 52*b* that rigidly attach to the sides of storage units 50*a*, 50*b*. In other embodiments, the storage units 50*a*, 50*b* can be moved independently to different heights to achieve lengthwise patient inclinations during transfer other than horizontal, e.g., Trendelenburg position; in such an embodiment, the reinforcing beams could be extendible, e.g., telescopic. Trendelenburg inclination of the lifting web system can also be achieved with a structure in which the web and strap storage units are rigidly attached to the horizontal reinforcement beams, and the reinforcement beams are tilted by elevating or lowering the attachment means of the beams to the vertical columns to different levels.

While the home health patient care system of the present invention could be manually powered to drive movement of transfer device 30 (as well as lifting web system 32), these features are preferably driven by one or more automated motors which can placed at various convenient locations about the device. One such motor 51 is used for moving the lifting system up/down on the vertical posts. Each outside corner of the storage units contains a bracket that engages one of the four vertical posts which allows for vertical sliding but maintains the desired X-Y alignment with the rest of the machine. Additionally, each bracket contains a nut that engages a vertical lead screw located adjacent and parallel to each vertical post. The four lead screws are all supported at their upper ends by bearings, and are connected mechanically by a sprocket/chain drive system to the single drive motor 51. With each lead screw being supported by a bearing on top, and with the weight of the patient support platform applied below this bearing, the lead screws all operate in tension. This arrangement prevents buckling in the lead screw. The vertical drive system also assures that all lead screws operate at the same speed and direction. This keeps lifting web system 32 horizontal during its up and downward movements to acquire and deliver the patient. It is also possible to operate the two head end lead screws with a first drive motor, and the foot end lead screws with a second drive motor. With this arrangement, the PSP could be inclined relative to the patient support surface or mattress. This could be useful if the patient is to be transferred to or from a support surface that is not horizontal but rather inclined to the long axis of the patient’s bed.

FIG. 1A shows transfer device 30 in a stowed position aligned with the bed. While stowed, lifting web system 32 is not visible and so does not present any eyesore, and further is tucked out of the way so that it does not physically take up any space that the patient or caregiver might want to occupy or use. The stowed position of transfer device 30 generally represents the storage/standby state of system 10 while the patient is on the bed, i.e., before any patient transfer has started. In this state, the webs forming the web assembly of lifting web system 32 are substantially stored on spools located within web storage unit 50*b*, except for the leading portion of the webs (wrapped around the roller nose assembly as discussed further below) which extends just slightly beyond web storage unit 50*b*. Also in this initial state the two side pull straps for the webs, whose proximate ends are wound on another spool in strap storage unit 50*a*, reach most of the length of the transfer device with their distal ends attached to the roller nose assembly. In other words, in the initial state the web assembly is fully retracted while the pull straps have been fully extended.

Figure 1B:
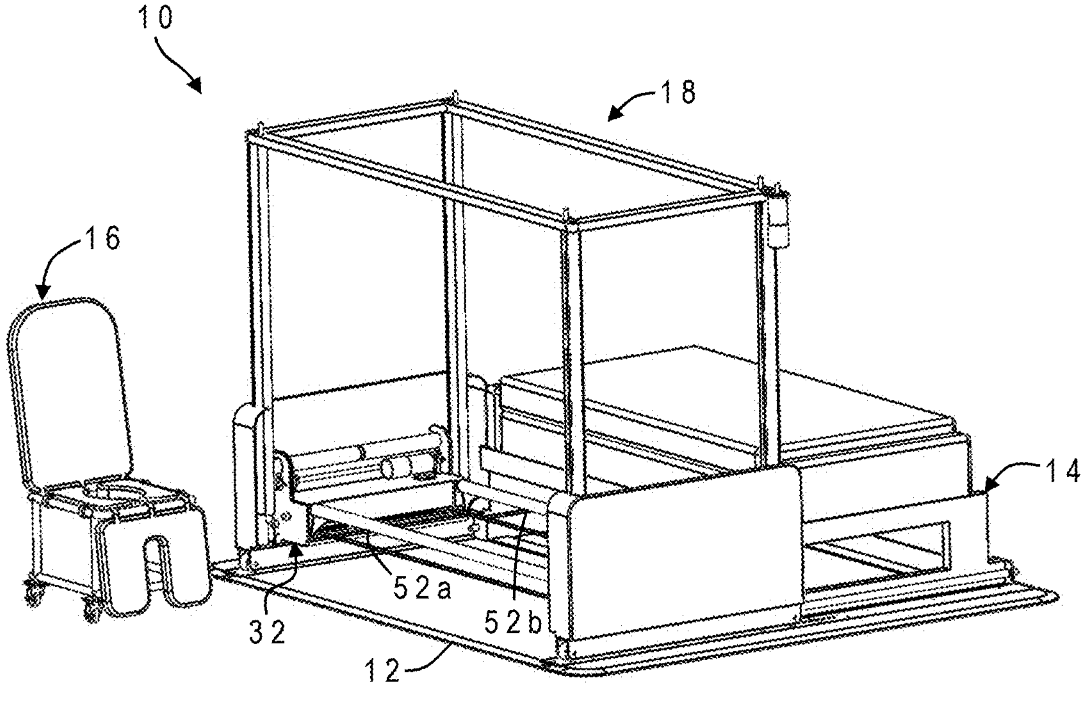
FIG. 1B is a perspective view of the automated home health patient care system of FIG. 1A showing the transfer device moved to one side of the bed, revealing a lifting web system carried by the transfer device.
Figure 1C:
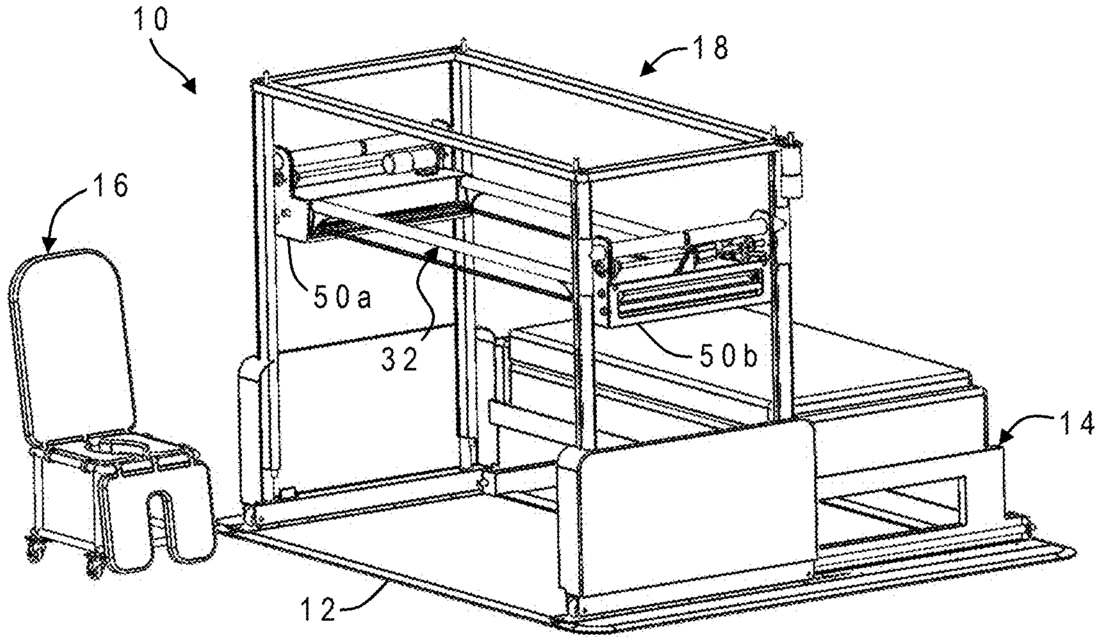
FIG. 1C is a perspective view of the automated home health patient care system of FIG. 1A showing the transfer device at the side position with the lifting web system raised to a clearance level.
Figure 1D:
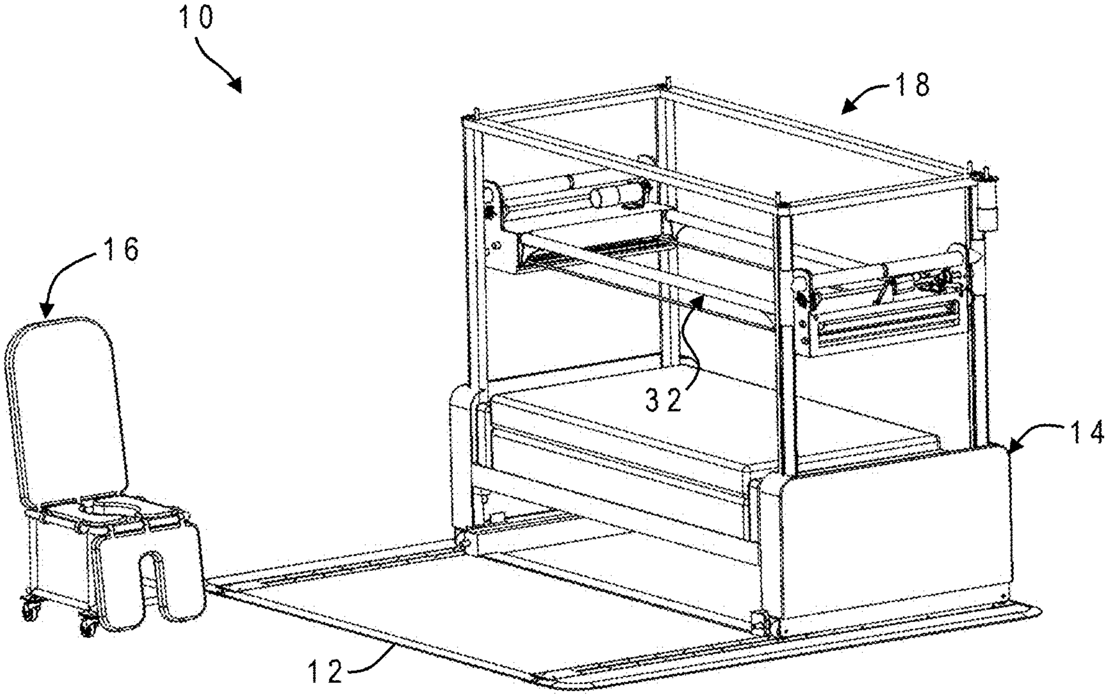
FIG. 1D is a perspective view of the automated home health patient care system of FIG. 1A showing the transfer device moved back into alignment with the bed while the lifting web system remains raised.
Figure 1E:
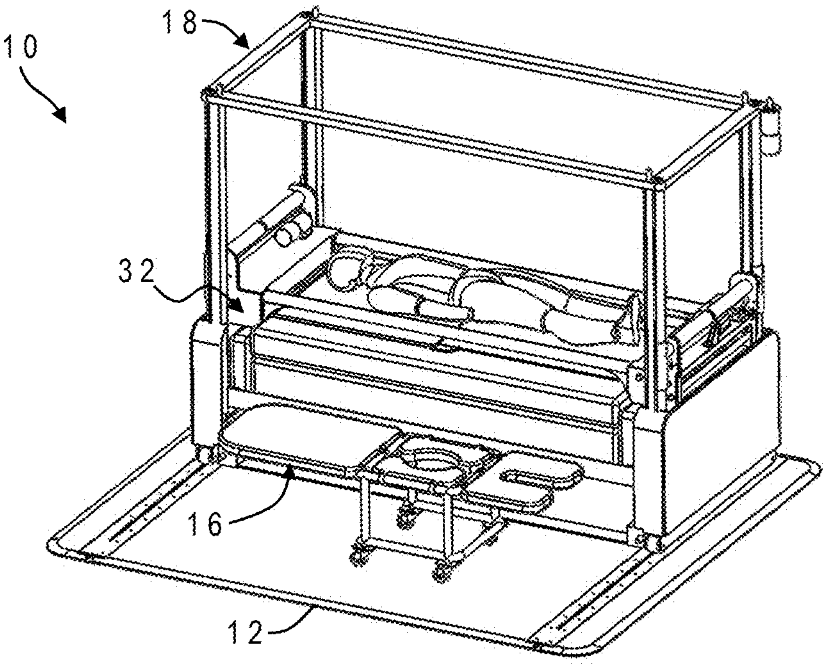
FIG. 1E is a perspective view of the automated home health patient care system of FIG. 1A showing the transfer device in the bed position with the lifting web system lowered to the bed height for patient acquisition using a web assembly which extends under the patient and with the back and leg support cushions of the patient-receiving chair rotated from their normal vertical positions to horizontal to receive the patient being transferred in a horizontal (supine) position.

FIG. 1B shows transfer device 30 moved to one side of the bed in anticipation of acquisition and delivery of the patient to accessory 16 on that side of the bed. In FIG. 1B only the transfer device itself has moved and, within the transfer device, lifting web system 32 is still in its stowed position (fully retracted inside its storage unit). This stowed level is about 5" from the floor (adequate space for the docking station described further below in conjunction with FIGS. 7 and 8). FIG. 1C shows transfer device 30 at this same side position but lifting web system 32 has been raised to a clearance level which allows more than adequate space to be moved over the patient; the clearance level may be about 68" above the floor. FIG. 1D shows transfer device 30 moved back into alignment with the bed while lifting web system 32 remains fully retracted inside its storage unit. FIG. 1E shows transfer device 30 in the bed position with lifting web system 32 lowered to the bed height for patient acquisition, now depicting the patient resting on the bed.

Up to this point, the web assembly of lifting web system 32 has remained fully retracted and now, in the position of FIG. 1E, lifting web system 32 can be actuated to wind up the straps into strap storage unit 50*a* and thereby pull the web assembly forward, making it slowly crawl underneath the patient. In the preferred implementation, the web assembly is first pulled under the patient's feet, i.e., strap storage unit 50*a* is at the head of the device and web storage unit 50*b* is at the foot of the device, but this orientation could be reversed. It can also be seen in FIG. 1E that the lowest height of reinforcement beams 52*a*, 52*b* is still several inches above the bed surface, i.e., the pull straps and webs emerge from their respective storage units (near the bottom edge of the storage units) in a plane that is several inches below the reinforcement beams. This construction ensure that lowering of lifting web system 32 onto the bed does not result in accidental squeezing or pinching of any part of the patient (e.g., foot or hand) that might be overhanging the mattress. In the illustrative embodiment this vertical clearance space is 6".

Figure 1F:
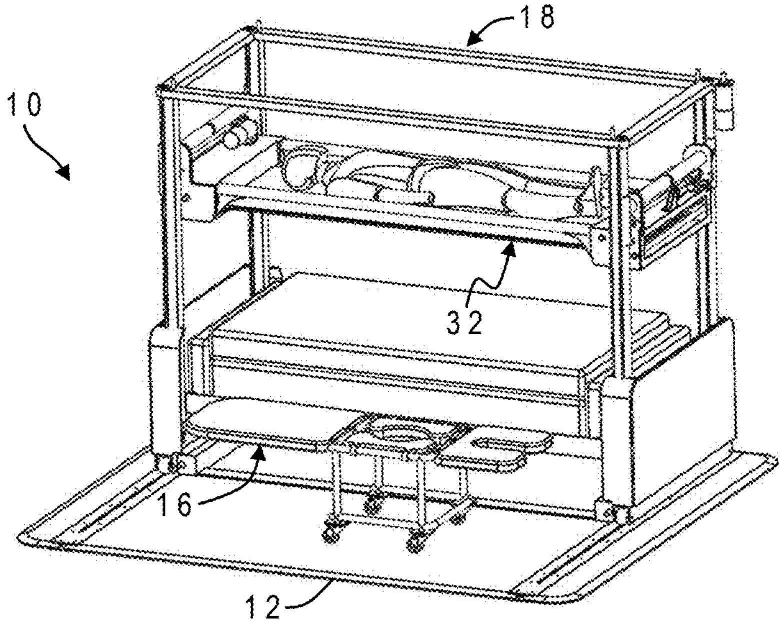
FIG. 1F is a perspective view of the automated home health patient care system of FIG. 1A showing the transfer device in the bed position with the lifting web system raised to a transfer level while supporting the patient on the web assembly.
Figure 1G:
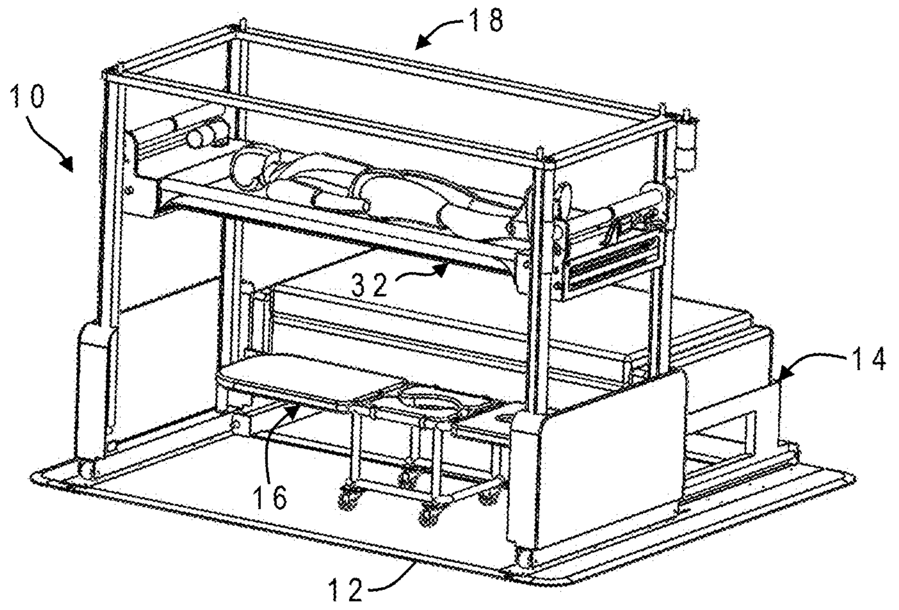
FIG. 1G is a perspective view of the automated home health patient care system of FIG. 1A showing the chair moved adjacent the bed and the transfer device moved to the side while the lifting web system remains at the transfer level overlying the chair.
Figure 1H:
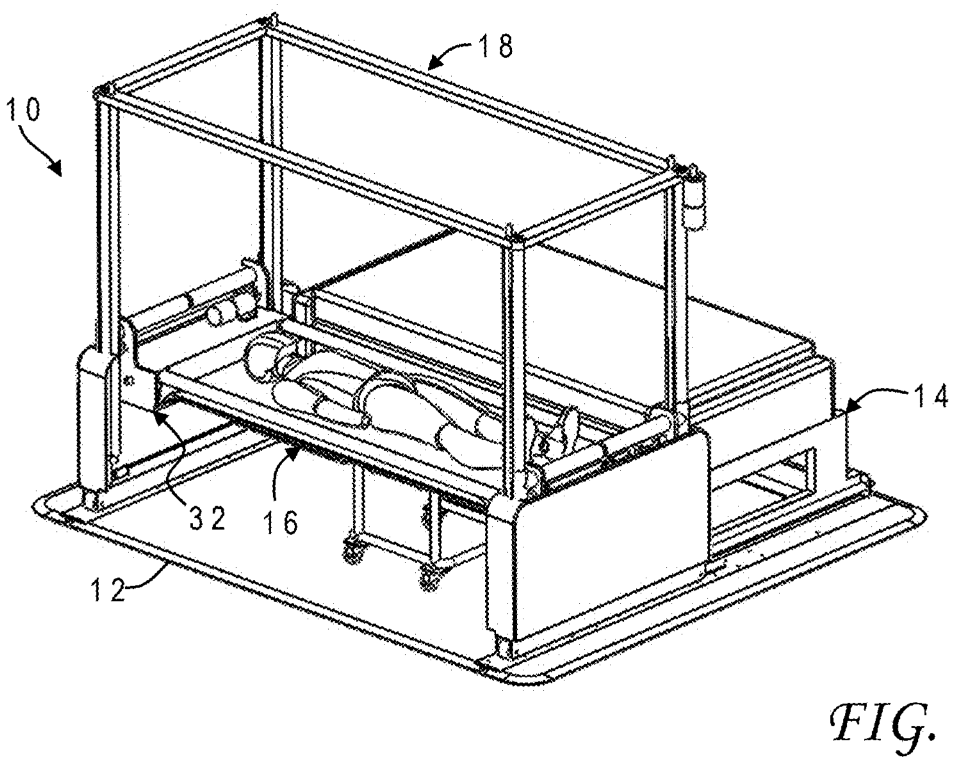
FIG. 1H is a perspective view of the automated home health patient care system of FIG. 1A showing the transfer device with the lifting web system lowered down to the chair level for offloading the patient onto the chair.

FIG. 1F shows transfer device 30 still in the bed position but lifting web system 32 has been raised to a transfer level while supporting the patient so the patient is no longer supported by the bed but rather is carried in the web assembly. The transfer level is preferably between 6" to 18" above the bed support surface depending on the size of the patient. Additionally, it may be convenient for the caregiver to lift the patient to the greatest height in the transfer level to make it easier to change the bed linens with the patient supported well above the bed. FIG. 1G shows accessory 16 moved adjacent the bed and transfer device 30 moved to the side while lifting web system 32 remains at the transfer level. In this example where accessory 16 is a chair, the feet and back portions of the chair have been folded to be even with the horizontal seat portion, so the patient can be comfortably set down on the chair. Accessory 16 may have formed or printed thereon one or more registration features (e.g., arrow markings) that align with features on the transfer frame. These registration features would not be necessary when accessory 16 is physically aligned and secured relative the side of the machine by a docking station whose description follows. FIG. 1H shows transfer device 30 with lifting web system 32 lowered down to the chair level; in this position, lifting web system 32 will wind up the dual webs into web storage unit 50*b*, returning to the web assembly to a fully retracted state and thereby offloading the patient onto the chair.

The foregoing steps can be reversed to get transfer device 30 out of the way for access to the patient on the accessory, and eventually return transfer device 30 to its stowed position. So once the patient is offloaded as in FIG. 1H, lifting system 32 can be moved up while transfer frame 30 remains stationary, to the transfer level seen in FIG. 1G, or more preferably to the clearance level seen in FIG. 1C. Transfer device 30 can then be rolled back in alignment with the bed as in FIG. 1D, and the caregiver can return the back and feet portions of the chair to their normal positions and provide whatever care is necessary to the patient. If the patient is to be away from the bed for an extended period and it is desired to hide the mechanical features of system 10 for that duration, transfer device 30 can be moved back to the side again (FIG. 1C), lifting web system 32 lowered to the stowed level (FIG. 1B), and transfer device rolled back to the bed (FIG. 1A), returning system 10 to its initial state.

The design is much more compact than conventional patient transfer systems, and less obtrusive within the patient's room. There is no need to store any part of the patient lifting platform over the patient's head as in old designs which can seem somewhat ominous, and the patient lifting platform is now completely stored under the bed. All that is seen of the machine when it is not in use is something resembling a 4-poster bed with a head and foot board. Vertical posts 34 can easily be modified in design to appear as ornamental bedposts. This ornamentation can be augmented with an attractive overhead canopy placed about crossbars 36 and 38 at the top of transfer device 30 so that the entire transfer device is effectively concealed and now, rather than presenting a cold, institutional machine, the enhanced system lends a certain beauty to the invention. This design further opens up the end of the framework at the foot of the bed so the patient has an unobstructed view beyond the foot of the bed, such as for watching television.

There may be other steps or devices used that are unrelated to the patient transfer function itself that can be included as part of the overall process. For example, the caregiver may want to employ a disposable mattress pad or sheet which can protect bed linens as well as the lifting webs. The disposable sheet would be located under patient while in bed, and would be picked up by the lifting webs moving under it when the patient is removed from the bed, and disposed of at a dressing table. This would prevent the webs on the patient transfer device from being contaminated with liquid or solid residue from the patient. The disposable sheet may have special shape or construction features or that require the caregiver to lift the exposed corners of the sheet to ensure that the lifting webs reliably travel under the disposable sheet.

Figure 2A:
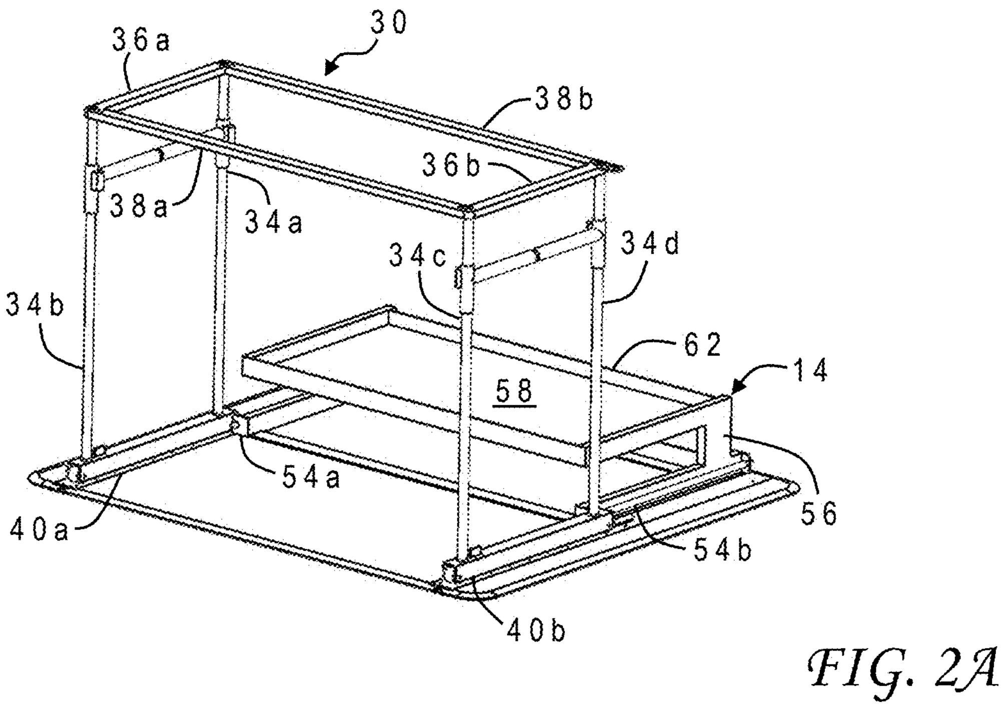
FIGS. 2A-2B are perspective views of a transfer frame and a bed frame used in the automated home health patient care system of FIG. 1A with the bed components and lifting web system removed to illustrate how the transfer frame slides (rolls) into engagement with the bed frame.
Figure 2B:
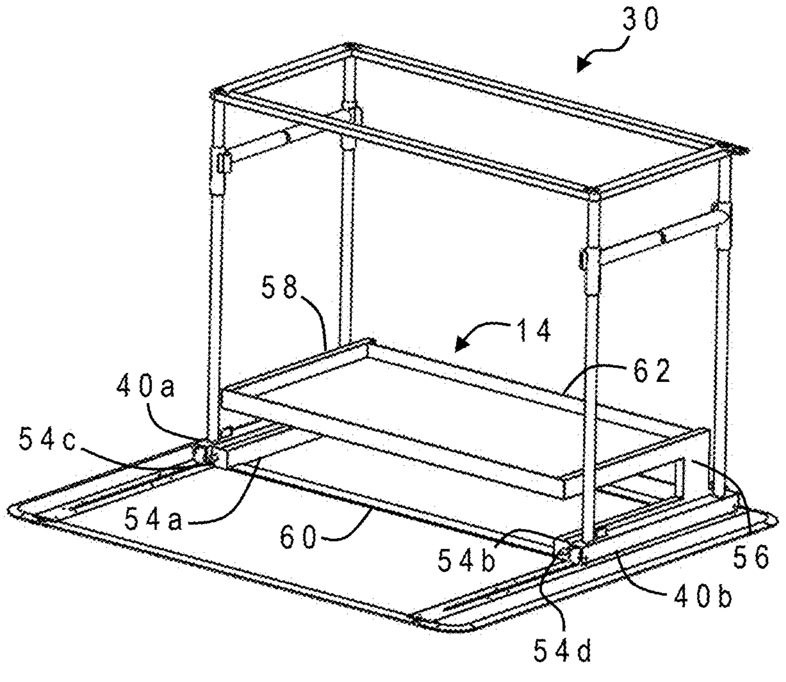

Referring now to FIGS. 2A-2B, most exterior details of system 10 have been omitted (as well as lifting system 32) to show how transfer frame 30 slides into engagement with bed frame 14. Bed frame 14 is preferably a unitary construction, having a C-shaped structure with two generally parallel foot rails 54*a*, 54*b* at the head and foot ends, two vertical plates 56 formed at the back side of bed frame 14 and formed integrally with foot rails 54*a*, 54*b* (only one of which plates 56 is visible in the figures) and a horizontal bed support 58 attached to the top portions of the vertical plates and maintained in a cantilever fashion. Foot rails 54*a*, 54*b* are sized, shaped and positioned to act as tracks for roller base slides 40*a*, 40*b*, thereby keeping transfer device 30 smoothly aligned as it moves sideways. Floor mat 12 is preferably provided with load-bearing wear-resistant strips along the paths of the wheels of transfer frame 30. The edges of bed support 58 are flanged to define an opening or pocket for receiving box springs 22. A reinforcement prop 60 can be attached to foot rails 54*a*, 54*b* at the front side to ensure that foot rails 54*a*, 54*b* are maintained at the proper spacing to receive roller base slides 40*a*, 40*b* of transfer device 30. Bed frame 14 can also have an ornamental panel 62 vertically disposed along its back side, supported by the vertical plates. The C-shaped design results in rectangular cutouts or channels under bed support 58 at each end (head and foot), which neatly accommodate strap/web storage units 50*a*, 50*b* in a tongue-and-groove manner when transfer device 30 is stowed, making more efficient use of space and saving clutter in the patient's room. Bed frame 14 could be further adapted to allow movement to either side, i.e., offloading the patient to the left or right of the bed. Transfer device may include other components not shown, such as one of more counterweights for balance.

In the illustrative embodiment, transfer device 30 is impelled sideways using a horizontal, dual-direction rack-and-pinion drive system 54*c*, 54*d* mounted to the outside of each lower horizontal leg of the C-shaped frame. There is one rack-and-pinion drive unit on each end of the bed frame. The rack-and-pinion drive system connects to transfer device 30 through horizontal tabs on the sides of the racks and vertical pins on the inside surface of the horizontal base tubes with wheels on transfer device 30 as previously described. Each dual-direction rack-and-pinion drive unit contains an open-sided square tube containing low friction wear plates inside it. A 40" long 10 pitch rack slides inside the open-sided square tube against and supported by low friction wear plates, and with its teeth facing upward. Cutouts are provided at each end and in the top surface of the rack support tubes for two 10 pitch pinion gears. The teeth of these pinion gears engage the teeth in the rack, and the bores of the pinions are parallel to each other and parallel to the long sides of the base frame. Each pinion gear has its bearing mount in the horizontal leg of the C-shaped frame, and is driven by a timing belt pulley from another timing belt pulley mounted at the ends of the central shaft running down the lengthwise center of the bed frame. With this arrangement, all of the pinions are mechanically connected, and all operate in exact angular phase to one another while turning at the same speed and direction. Rotation of the pinions drives both racks at the same speed and direction, which in turn pushes transfer device 30 to the right or left side of the bed frame. A single variable-speed reversible motor is used to drive the rack-and-pinion system. This motor rotates the central shaft that drives timing belt pulleys for each of the rack driving pinions located at the corners of the base frame.

Figure 3:
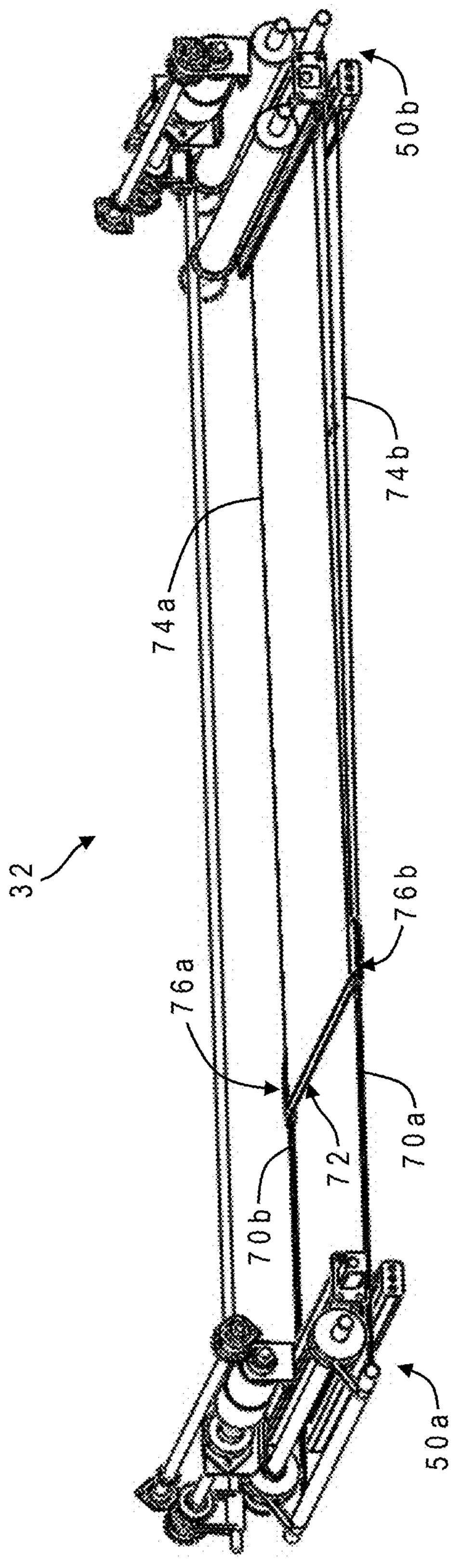
FIG. 3 is a perspective view of the lifting web system in accordance with one implementation of the present invention with the outer enclosures of a strap storage unit and a web storage unit removed to reveal interior details, depicting pull straps attached at their distal ends to the sides of roller nose assemblies at the front end of the web assembly.

Details of lifting web system 32 are explained with further reference to FIGS. 3-6. FIG. 3 is a perspective view of lifting web assembly 32 showing the pull straps 70*a*, 70*b* emanating from strap storage unit 50*a* through a slot formed in its housing and reaching across much of the length of lifting web assembly 32. The distal end of strap 70*a* is attached to one side of a roller nose assembly 72 and the distal end of strap 70*b* is attached to the other side of roller nose assembly 72. Roller nose assembly 72 supports an upper web 74*a* and a lower web 74*b* emanating from web storage unit 50*b* through a slot formed in its housing. The interior mechanisms of storage units 50*a*, 50*b* are discussed in conjunction with FIGS. 4 and 5.

The widths of upper and lower webs 74*a*, 74*b* are substantially the overall transverse width of lifting web system 32. Upper and lower webs 74*a*, 74*b* may be constructed of any strong flexible material such as ballistic nylon or Kevlar. The outside surface of each web is preferably coated with polyurethane while the inside surface of coated with polytetrafluoroethylene. Upper web 74*a* is wrapped around the forward edge of an upper roller nose 76*a*, and lower web 74*b* is wrapped around the forward edge of a lower roller nose 76*b*, the upper and lower roller noses 76*a*, 76*b* together forming roller nose assembly 72. So a portion (flight) of each web is located between both roller noses, i.e., there are four layers of webs total in the assembly, outside and inside flights of upper web 74*a*, and outside and inside flights of lower web 74*b*. Further details of roller nose assembly 72 may be understood with reference to U.S. Pat. No. 8,789,219 (particularly FIG. 9), which is hereby incorporated, although the illustrative embodiment of the present invention does not include an intervening strength layer in the web assembly.

One end of upper web 74*a* (the outside loop) is anchored in storage unit 50*b*, while the other end (the inside loop) is taken up on a first supply spool within web storage unit 50*b*. Similarly, one end of lower web 74*b* (the outside loop) is fixed in web storage unit 50*b*, while the other end (the inside loop) is taken up on a second supply spool within web storage unit 50*b*. In this manner, as roller nose assembly 72 is pulled forward by straps 70*a*, 70*b* (in this embodiment, from the foot end of transfer frame 30 toward the head end) the upper and lower webs are pulled from their respective supply spools, and the webs are fed out the front of roller nose assembly 72 to slide between the patient and the bed/table/chair with essentially no frictional engagement.

Upper roller nose 76*a* and lower roller nose 76*b* are slotted flexible plastic rods that move together, and are mounted across the front edges of two 4.0" wide flexible spring steel plates that are separated by a gap of approx. 0.12". The flexible spring steel plates are both attached at their ends to 0.12" thick blocks containing slots at one end to receive the pull straps on each side of roller nose assembly 72. Both pull straps 70*a*, 70*b* are actuated from the other end of lifting web system 32 opposite the webs. Pull straps 70*a*, 70*b* are constructed of any high tensile strength material such as Kevlar or nylon, and are attached to upper and roller noses 76*a*, 76*b* using buckles or rings which receive a loop of the strap which is then folded back on itself and sewn. In the illustrative embodiment, separate drive motors are used for the strap spools and the web spools, so only one motor at a time is needed for web extension or retraction. Both of the web spools are driven (synchronized) for retraction so they exert force from both of the upper and lower webs to evenly pull back the roller nose assembly.

FIG. 4 illustrates interior details of strap storage unit 50*a* with the exterior housing removed. The proximate ends of the pull straps are attached to respective strap spools 80*a*, 80*b* sharing a common shaft 82 and each pull strap travels around a roller 84 to be wound up on the strap spools. Two spools are used rather than one to provide side flanges on each side of the webs to assure that the webs wind over top of the previous layer and do not telescope. Shaft 82 is actuated via a drive motor 86 which is coupled to shaft 82 via various gears, sprockets and/or chains. When motor 86 is energized, shaft 82 rotates to wind up the straps on the strap spools.

FIG. 5 illustrates interior details of web storage unit 50*b* with the exterior housing removed. One end of each web is anchored (affixed) just inside the housing by clamping or sandwiching the end between a plate integrally formed with the housing of web storage unit 50*b* and a bar that is tightly attached to the plate via fasteners such as bolts. Alternatively, this end of a web can be formed into a sewn pocket across its width and the bar can be inserted in the pocket and then fastened to the plate. The design preferably allows the webs to be easily replaced by using removable fasteners for this purpose. The other end of each web is attached to a respective web spool 90*a*, 90*b*, that is, upper web 74*a* is wound on spool 90*a* and lower web 74*b* is wound on spool 90*b*. Each web spool is mounted on its own shaft and keyed relative to its shaft to prevent slippage, and both webs travel around a common roller 92 to be wound up on the web spools. The web spool shafts are actuated in synchronization via another drive motor 94 which is again coupled to the shafts via various gears, sprockets and/or chains. When motor 94 is energized, the web spool shafts rotate to wind up the webs on the respective web spools.

These interior features of strap storage unit 50*a* and web storage unit 50*b* may be attached to their respective housings by any convenient means, such as screws, bolts or other fasteners, welding, mounting brackets, etc.

FIGS. 4 and 5 also depict one of the preferred fastening or locking features of the web assembly that can be used with various implementations of the present invention, namely, clamping mechanisms 96*a*, 96*b*. Each clamping mechanism includes an upper clamping bar and a lower clamping bar that extend across the full width of the webs. Each clamping bar has formed thereon a pinch strip. When the web assembly is in a fully-extended state, with the roller nose assembly just inside the strap storage unit, the clamping mechanisms can be actuated at each end of the web assembly to forcibly pinch the webs between the pinch strips. In the preferred embodiment, the pinch strips are formed of steel but are slightly convex, that is, slightly thinner at the ends and thicker in the center to provide a more uniform clamping force across the width of the bar. While both clamping bars may be displaced for this purpose, in the exemplary embodiment the upper clamping bars are fixed and only the lower clamping bars are actuated. The clamping bars may be actuated according to designer preference, such as using solenoids, cams driven by lead screws, or eccentrics.

The locking features of the web assembly can further include a batten arrangement seen in FIG. 6. A batten 98 is formed on at least one of the webs that forcibly abuts the gap formed by clamping mechanism 96*b*. This batten arrangement can be used in other implementations which do not provide a clamping mechanism at the web storage unit, such as having the batten abut the inner face of the web storage unit at a narrow exit slot. The batten thereby prevents further extension of the webs when the web assembly is in the fully-extended state. Although the figures only illustrate a single batten, two battens can be provided on the same web, one which abuts the strap storage unit clamp and another which abuts the web storage unit clamp. In this manner, the clamping mechanisms can be actuated to provide a very strong but comfortable hammock or cot-like support for the patient. Drag brakes can optionally be used on the drive motors for each storage unit 50*a*, 50*b*, to prevent any sudden dropping of the web assembly in case of accidental release of the spools, and to keep webs and straps tight during rewinding, so as to prevent droop in the webs that could impair catching on the base frame or docking station during stowing of the patient lifting frame.

FIGS. 7 and 8 illustrate a novel docking station that may optionally be employed with automated home health patient care system 10 to receive, locate and clamp the accessory device, e.g., chair, in a controlled manner in accordance with one implementation of the present invention. For the patient's safety, the chair should be accurately position in X-, Y-, and Z-coordinates relative to the lengthwise and widthwise center of the patient, preferably to a tolerance of 0.5". This layout assures that the patient's body is not injured by unwanted contact with chair arm rests or structural features, and is not hanging over the edges of cushions. Although it may be possible for a caregiver to position the chair to these tolerances, it can be very difficult and time consuming, and verifying that the chair is correctly positioned may not be easy. It is also desirable to lock the chair in position so it does not move or shift during the patient transfer process. The docking station provides a more efficient means for accurately locating, verifying, and locking the position of the chair.

Referring first to FIG. 7, in the illustrative embodiment the docking station includes a retractable docking frame 100 attached to bed frame 14, and a mounting frame 101 attached to the bottom of accessory 16. Docking frame 100 includes an extendable slide system 102 which extends and retracts a rectangular metal docking plate 103 approximately 4" high and 24" long from a retracted position flush with the side of the bed frame to an extended position approximately 8" away from the side of the bed frame. The bottom edge of docking plate 103 is located approximately 3" from the floor. One end of docking plate 103 has formed thereon a flange with a small gap forming a permanent hook or latch feature 104, while the other end has a cutout through which passes a moveable hook 105. Docking frame 100 is retractable by means of slide system 102 so when it is being used it can be extended outwardly to engage the side of the chair, and when not in use it is completely retracted under the bed, so the caregiver does not trip on it while making the bed or servicing the patient.

With further reference to FIG. 8, mounting frame 101 is attached to one side of the chair facing the bed frame, and includes a second rectangular metal mounting plate 106 that is approximately 4" high by 22" long by 0.25" thick. Mounting plate 106 is securely affixed to the under and side structure of the chair such that a first end of mounting plate 106 is located at the same height as hook 105 relative to the floor. In this manner, when docking frame 100 is fully extended, and hook 105 pulled back, the chair can be placed adjacent the bed frame with a second end of mounting plate engaged by latch 104. Hook 105 can then be moved out to engage the first end of mounting plate 106, thereby securing the chair in the docked position.

Figure 9:
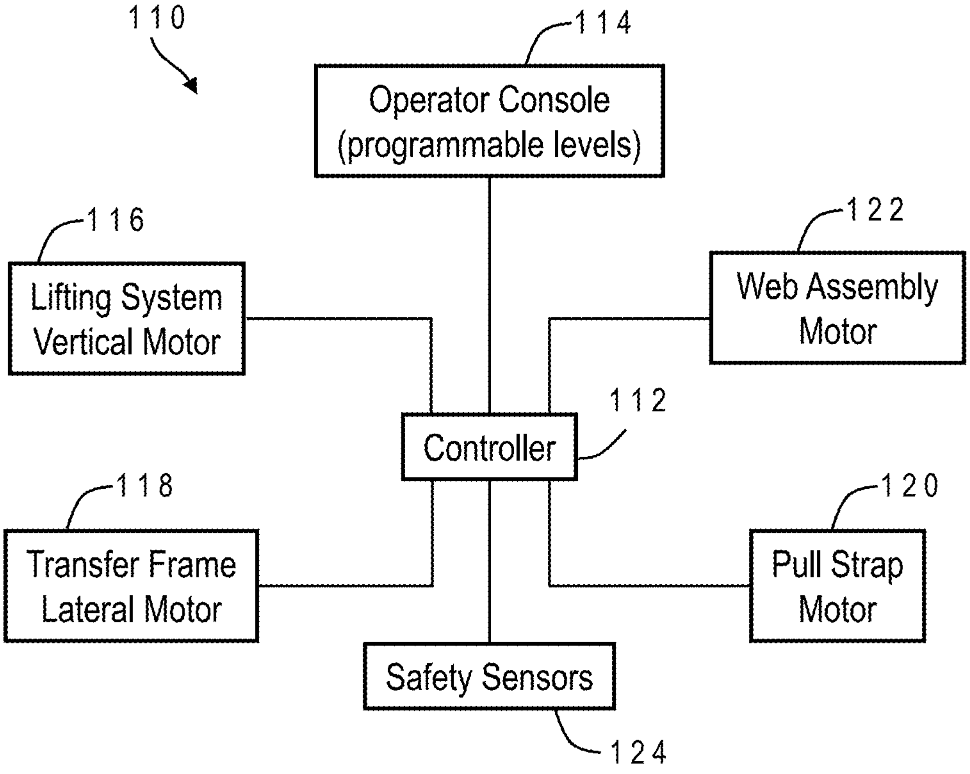
FIG. 9 is a block diagram of an electronic control system for the automated home health patient care system of FIG. 1A in accordance with one implementation of the present invention.

While these actions for securely docking the accessory may be carried out manually by the caregiver using various mechanical means such as levers, cranks, racks, etc., they are preferably automated by incorporating control of docking frame 100 into the electronic control system discussed further below in conjunction with FIG. 9. For such an implementation, when the control system receives the caregiver command, a linear electric drive in the docking station horizontal slide system causes docking plate 103 to move outwardly, and instruct hook 105 to withdraw. Once the caregiver has moved the chair so its mounting plate is abutting and coincident with the docking plate, with one end engaged by latch 104, a sensor in the docking plate signals the control system that the chair is in position, and the control system can then energize the actuator for hook 105 to secure the other end of the mounting plate. After the patient has been transferred, the control system can reverse this docking process, moving the docking frame back under the bed frame.

For left/right transfer functionality, a similar docking interface can be provided on the other side of the bed frame.

The specific dimensions of the various components of automated home health patient care system 10 may vary greatly depending upon different patients and patient's environments. For example, larger patients may require an oversize system while smaller systems can be designed for children. Also, a patient may sleep in a small room that only accommodates a small bed which would mean a narrow system, but someone else might have a very large bedroom that allows for an extra-wide version of the system. The size and shape of transfer device 18 can be based on the size and shape of the bed being used. The invention can work with any type and size of bed, standard sizes like twin/queen/king, or hospital designs. The system also accommodates standard low height articulated hospital bed frames in which the frame can be electrically actuated from a flat horizontal configuration to one in which the head end of the mattress is inclined to lift the patients back and head, or in which the legs or feet are elevated. For patient acquisitions, the articulated bed frame and mattress must be returned to their horizontal position. The patient could even share the bed with a spouse-caregiver.

The following approximate dimensions are thus considered exemplary only and should not be construed in a limiting sense. In the illustrative embodiment, bed frame is sized to accommodate a 42"×84"×6" mattress with a 10" high box spring. The outer perimeter of transfer frame 30 is 32" wide by 92" long, with a maximum height of 72". These dimensions for the bed frame and the transfer frame result in maximum lateral movement of the transfer frame of 42". The depicted design has a patient web width of 24" and working patient height capacity of 76", which can accommodate most large and tall patients plus some bariatric patients; this leads to a total web length of 180". The pull straps are 1½" wide, 10' long, and 0.06" thick. In some embodiments, transfer frame 30 and the webs may extend beyond both sides of the bed approximately a mattress width, to allow centering of the webs on the approximate center of the patient no matter where they are lying in bed. Roller nose assembly 72 is constructed of upper and lower spring steel plates 5" wide, 28" long (transverse across the web width), attached to each other through ⅛" thick connector plates creating a ⅛" wide gap between the flexible plates through which the upper and lower lifting webs pass as described above.

As noted above, the various moving parts of automated home health patient care system 10 could be manually driven or powered by small (handheld) tools, but in the preferred embodiment the aforementioned motors are used to completely automate the system and greatly simplify the process. FIG. 9 depicts one example of an electronic control system 110 that can be used to operate the various motors of system 10. Electronic control system 110 has a solid-state programmable controller 112 connected to an operator console 114. Operator console 114 can have any type of buttons, switches, levers, etc., depending on the designer to carry out the movement functions. Operator console 114 also preferably has an interface which allows the operator to set (program) certain system parameters. Among these parameters include the different height levels for the different vertical positions of lifting web system 32. As noted above, control system 110 might allow a user to set four different height levels: stowed, clearance, acquisition/delivery, and transfer. Even more levels could be programmable, e.g., where system 10 is being used with multiple accessories 16 (chair/table/station) having different effective heights for the delivery. This feature also makes system 10 more flexible in terms of bed heights.

Controller 112 uses control logic to actuate the motors, as well as other components such as the clamping mechanism, in accordance with the foregoing description. These include a lift system vertical motor 116 which raises and lowers lifting web system 32, a transfer frame lateral motor 118 which moves transfer frame 30 from the bed position to the side and back, a pull strap motor 120 which winds up pull strap spool 84, and a web assembly motor 122 which winds up web spools 94*a*, 94*b*. Controller 112 may also be programmed to taken certain safety precautions and, to this end, may have one or more sensors around system 10 to indicate the state or position of different components. For example, controller 112 can ensure that lifting web system 32 is never lowered to its stowed position when it is aligned with the bed, i.e., it can only be lowered to the stow level when it is off to the side. Controller 112 can also prevent the web assembly from retracting if lifting web system is at any level other than a preprogrammed delivery level. All of the motors and electronics for control system 110 can be powered from an electrical wall socket or a portable source such as a rechargeable battery (not shown).

Figure 10:
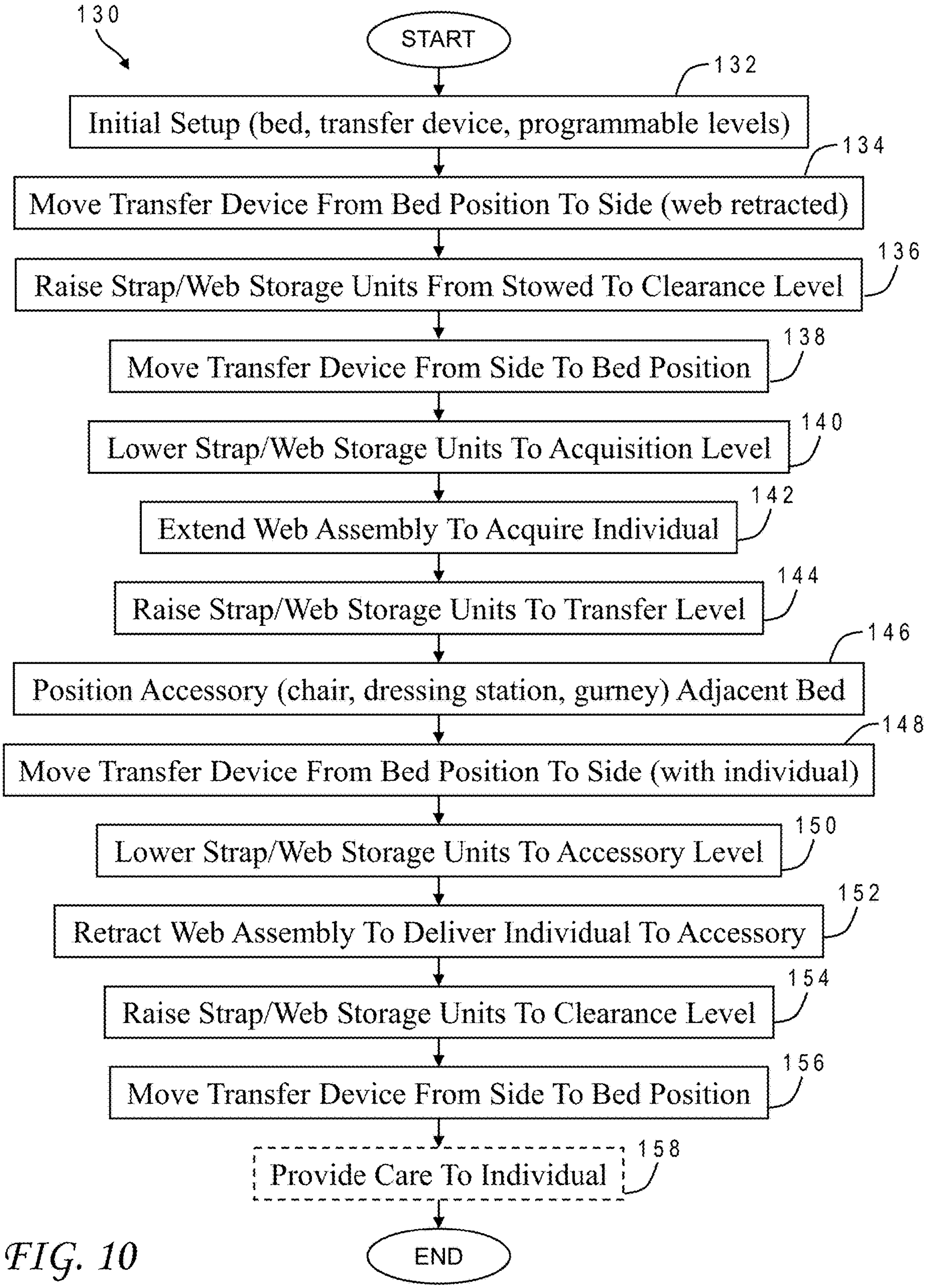
FIG. 10 is a chart illustrating the logical flow for a patient transfer process in accordance with one implementation of the present invention.

The present invention may be further understood with reference to the chart of FIG. 10 which illustrates the logical flow for a patient transfer process 130 in accordance with one implementation. Process 130 begins with the initial setup of the system 132, including positioning the bed frame and placing the box springs and mattress therein, moving the transfer device into place, and programming any desired delivery/acquisition levels. Thereafter when the patient is on the bed and needs to be transferred, the transfer device is moved from the bed position to the side position 134. The strap/web storage units are raised from their stowed position to a clearance level 136, and the transfer device can be moved from the side back to the bed position 138 with the lifting web system overlying the patient. The strap/web storage units are lowered to the acquisition (bed) level 140, and the web assembly is extended to acquire the individual 142. Once the web assembly is fully under the patient, the web locking mechanism is actuated and the strap/web storage units are raised to the transfer level 144. The accessory device, e.g., a chair, can then be moved adjacent the bed 146, and the operator moves the transfer device from the bed position to the side 148 such that the suspended patient is now overlying the chair. The strap/web storage units are lowered to the chair level 150, and the web assembly can be retracted to offload the patient onto the chair 152. The strap/web storage units are raised once last time 154 so the transfer device can be moved back out of the way with the bed 156. The caregiver may then attend to whatever needs the patient may have 158.

The present invention thereby provides a superior patient transfer system, for both the patient and the caregiver. It enables a single caregiver to easily lift and move even large, heavy patients, while eliminating caregiver and patient lifting injuries. Since all patient lifting and moving is done by machine, it is a straightforward matter for the caregiver to operate using a simple pushbutton pendant. Actual patient move time can be greatly reduced compared to conventional patient transfer devices, and the compact design means that little or no modifications are required to install in a patient's home. Product design and manufacturing techniques similar to those used for exercise equipment can be implemented for a very low product cost. The result is the preservation of patient well-being, comfort and dignity during the transfer process.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. For example, while the invention has been described in the context of a home care system for an average adult, it can be adapted for a variety of special circumstances such as bariatric systems, and for systems in nursing homes or hospital markets. The transfer system of the present invention can also be integrated with other existing hardware devices for patient care. Of course, the invention is not limited per se to moving patients, but also for animals or even inanimate objects. It is therefore contemplated that such modifications can be made without departing from the spirit or scope of the present invention as defined in the appended claims.

What is claimed is:

1. An automated home health patient care system comprising:

a wheeled transfer accessory having a patient support surface;

an elongate bed assembly having head and foot ends and a front side, said bed assembly including a transfer frame motor, a mattress and a C-shaped bed frame supporting the mattress and defining first and second channels at said head and foot ends respectively, said C-shaped bed frame having a first foot rail at said head end, a second foot rail at said foot end generally parallel to said first foot rail, a first horizontal lead screw assembly in said first foot rail, and a second horizontal lead screw assembly in said second foot rail, wherein said transfer frame motor selectively drives said first and second horizontal lead screw assemblies;

an elongate transfer device having a rectangular transfer frame and a lifting web system, said transfer frame including a first vertical corner post, a second vertical corner post, a third vertical corner post, a fourth vertical corner post, a plurality of upper crossbars attached to said vertical corner posts at their upper ends, a first roller base slide attached to a bottom end of said first vertical corner post and to a bottom end of said second vertical corner post at a head end of said transfer frame, said first roller base slide having one or more wheels and being sized and positioned to slidably engage said first foot rail of said C-shaped bed frame during sideways movement of said transfer frame, a second roller base slide attached to a bottom end of said third vertical corner post and to a bottom end of said fourth vertical corner post at a foot end of said transfer frame, said second roller base slide having one or more wheels and being sized and positioned to slidably engage said second foot rail of said C-shaped bed frame during sideways movement of said transfer frame, wherein said first and second roller base slides have lead screw nuts which engage said first and second horizontal lead screw assemblies respectively, and said lifting web system including an enclosed strap storage unit located at said head end of said transfer frame, mounted on and vertically movable along said first and second vertical corner posts, said strap storage unit being positioned within said first channel of said C-shaped bed frame when said transfer frame is in a stowed state in alignment with said bed frame, wherein said strap storage unit houses a first pull strap and a second pull strap each having proximate and distal ends, said proximate ends of said first and second pull straps being wound on one or more strap spools driven by a strap spool motor, said distal end of said first pull strap extending out of a first slot of said strap storage unit along a first side of said transfer frame and said distal end of said second pull strap extending out of a second slot of said strap storage unit along a second side of said transfer frame, an enclosed web storage unit located at said foot end of said transfer frame, mounted on and vertically movable along said third and fourth vertical corner posts, said web storage unit being positioned within said second channel of said C-shaped bed frame when said transfer frame is in said stowed state, wherein said web storage unit houses an upper web and a lower web each having first and second ends, said first end of said upper web being wound on an upper web spool driven by a web spool motor and said second end of said upper web being anchored inside said web storage unit, said first end of said lower web being wound on a lower web spool driven by said web spool motor and said second end of said lower web being anchored inside said web storage unit, a portion of each upper and lower web extending out of a slot of said web storage unit forming a roller nose assembly having an upper roller nose and a lower roller nose, said upper web being wrapped around a forward edge of said upper roller nose, said lower web being wrapped around a forward edge of said lower roller nose, said distal ends of said first and second pull straps being secured to said roller nose assembly, and at least one lifting system motor which drives vertical movement of said strap and web storage units; and an electronic control system for selectively activating said strap spool motor, said web spool motor, said transfer frame motor and said lifting system motor, said electronic control system having an operator console which allows an operator to program at least five different height levels of said lifting web system including a stowed level near a bottom of said transfer frame, a clearance level near a top of said transfer frame, an acquisition level at a height of said mattress, a transfer level which is lower than the clearance level but higher than the acquisition level, and a delivery level at a height of said patient support surface of said wheeled transfer accessory.

2. The automated home health patient care system of claim 1 wherein said lifting system further includes a web locking mechanism comprising:

an actuatable clamp attached to said strap storage unit and located on a side thereof facing said web storage unit which forcibly pinches said upper web and said lower web at said roller nose assembly when said roller nose assembly is in a fully-extended state to secure said upper and lower webs; and a batten formed on said upper web which forcibly abuts an inner face of web storage unit when said roller nose assembly is in said fully-extended state to prevent further extension of said upper web.

3. The automated home health patient care system of claim 1 wherein said electronic control system further includes:

one or more safety sensors which indicate a current sideways position of said transfer device relative to said bed assembly; and control logic which prevents said lifting web system from being lowered to the stowed position unless said transfer device is at a side position relative to said bed assembly.

* * * * *